(12) United States Patent
Duke

(10) Patent No.: US 10,895,495 B2
(45) Date of Patent: Jan. 19, 2021

(54) VIBRATION SIGNAL ANALYSIS FOR DETERMINING ROTATIONAL SPEED

(71) Applicant: Simmonds Precision Products, Inc., Vergennes, VT (US)

(72) Inventor: Alan M. Duke, Ferrisburg, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 366 days.

(21) Appl. No.: 15/926,512

(22) Filed: Mar. 20, 2018

(65) Prior Publication Data

US 2019/0293483 A1 Sep. 26, 2019

(51) Int. Cl.
| | | |
|---|---|---|
| *G01H 1/00* | (2006.01) | |
| *G01M 1/16* | (2006.01) | |
| *G01P 3/44* | (2006.01) | |
| *G06F 17/15* | (2006.01) | |
| *G06F 17/17* | (2006.01) | |
| *G01M 13/045* | (2019.01) | |
| *G01P 3/48* | (2006.01) | |

(52) U.S. Cl.
CPC ............ *G01H 1/003* (2013.01); *G01M 1/16* (2013.01); *G01M 13/045* (2013.01); *G01P 3/44* (2013.01); *G01P 3/48* (2013.01); *G06F 17/156* (2013.01); *G06F 17/17* (2013.01)

(58) Field of Classification Search
None
See application file for complete search history.

(56) References Cited

U.S. PATENT DOCUMENTS

| 5,115,671 | A | 5/1992 | Hicho | |
| 5,365,787 | A * | 11/1994 | Hernandez | G01H 1/003 324/207.25 |
| 8,567,238 | B2 | 10/2013 | Serra et al. | |
| 9,731,744 | B2 | 8/2017 | Carter et al. | |

(Continued)

OTHER PUBLICATIONS

Clifton et al. "Novelty Detection in Jet Engine Vibration Spectra", The Sixth International Conference on Condition Monitoring and Machinery Failure Prevention Technologies, p. 727-738, 2009 (Year: 2009).*

(Continued)

*Primary Examiner* — Roy Y Yi
(74) *Attorney, Agent, or Firm* — Kinney & Lange, P.A.

(57) ABSTRACT

Rotational speed of a rotating component is determined using frequency domain vibrational data. A time sequence of vibrational data of the rotating component is sensed and converted to the frequency domain vibrational data. A portion of the frequency domain vibrational data corresponding to an expected rotational speed of the rotating component is identified. A frequency bin index of the frequency domain vibrational data corresponding to a maximum vibration within the portion of the frequency domain vibrational data is identified. The maximum vibration at the identified frequency bin index and vibrations associated with adjacent frequency bin indices are fitted to a model curve. A floating point frequency bin index corresponding to a maximum of the model curve is identified, and the rotational speed of the rotating component is determined based on the frequency bin index corresponding to the maximum of the model curve.

16 Claims, 3 Drawing Sheets

(56) References Cited

U.S. PATENT DOCUMENTS

2017/0059603 A1    3/2017  Zabulon et al.
2017/0205439 A1    7/2017  Liu et al.

OTHER PUBLICATIONS

M. Gasior et al.: "Improving FFT Frequency Measurement Resolution by Parabolic and Gaussian Interpolation," AB-Note-2004-021 BDI, Jan. 1, 2004, https://cern.ch.gasior/pap/FFT_resol_note.pdf.
Extended European Search Report for European Patent Application No. 19161384, dated Jul. 18, 2019, 10 pages.
Ocak, Hassan and Loparo, Kenneth A; Estimation of the running speed and bearing defect frequencies of an induction motor from vibration data, Mechanical Systems and Signal Processing 18 (2004) 515-533, 19 pages.

* cited by examiner

VIBRATION SIGNAL ANALYSIS FOR DETERMINING ROTATIONAL SPEED

BACKGROUND

This disclosure relates generally to rotational speed determination, and more particularly to vibration signal analysis for determining rotational speed of a rotating component.

Many complex systems of components, such as modern aircraft systems, incorporate prognostics and health management (PHM) systems to identify system fault conditions and/or predict a remaining useful life of system components. Such PHM systems often utilize vibration diagnostic techniques that use known component geometries to determine frequencies of individual components based on rotational speed of the components. Many aircraft systems, however, do not include tachometers or other speed measurement sensors to directly measure the rotational speed of components. The addition of dedicated rotational speed sensors increases system cost, space, and weight, thereby negatively impacting the economic feasibility of the vibration diagnostic system.

SUMMARY

In one example, a method includes sensing a time sequence of vibrational data of the rotating component using one or more sensors, converting the time sequence of vibrational data to frequency domain vibrational data, and identifying a portion of the frequency domain vibrational data corresponding to an expected rotational speed of the rotating component. The method further includes identifying a frequency bin index of the frequency domain vibrational data corresponding to a maximum vibration within the portion of the frequency domain vibrational data, and fitting the maximum vibration at the identified frequency bin index and vibrations associated with adjacent frequency bin indices to a model curve. The method further includes identifying a floating point frequency bin index corresponding to a maximum of the model curve, and determining the rotational speed of the rotating component based on the frequency bin index corresponding to the maximum of the model curve.

In another example, a system includes a rotating component, one or more sensors, one or more processors, and computer-readable memory. The one or more sensors are disposed to sense a time sequence of vibrational data of the rotating component. The computer-readable memory is encoded with instructions that, when executed by the one or more processors, cause the one or more processors to convert the time sequence of vibrational data to frequency domain vibrational data, identify a portion of the frequency domain vibrational data corresponding to an expected rotational speed of the rotating component, and identify a frequency bin index of the frequency domain vibrational data corresponding to a maximum vibration within the portion of the frequency domain vibrational data. The computer-readable memory is further encoded with instructions that, when executed by the one or more processors, cause the one or more processors to fit the maximum vibration at the identified frequency bin index and vibrations associated with adjacent frequency bin indices to a model curve, identify a floating point frequency bin index corresponding to a maximum of the model curve, and determine the rotational speed of the rotating component based on the frequency bin index corresponding to the maximum of the model curve.

DETAILED DESCRIPTION

According to techniques of this disclosure, a system utilizes vibration signal analysis to determine the rotational speed of a rotating component. Rather than require a tachometer or other sensor to directly measure the rotational speed, a system implementing the techniques described herein determines the rotational speed based on sensed vibrational data of the rotating component. The system identifies a maximum vibration within a portion of frequency domain vibrational data corresponding to an expected rotational speed of the rotating component. A frequency associated with the maximum vibration is utilized to determine the rotational speed of the rotating component. Model curve fitting and interpolation techniques improve the accuracy of the maximum vibration detection and rotational speed determination operations.

Figure 1:
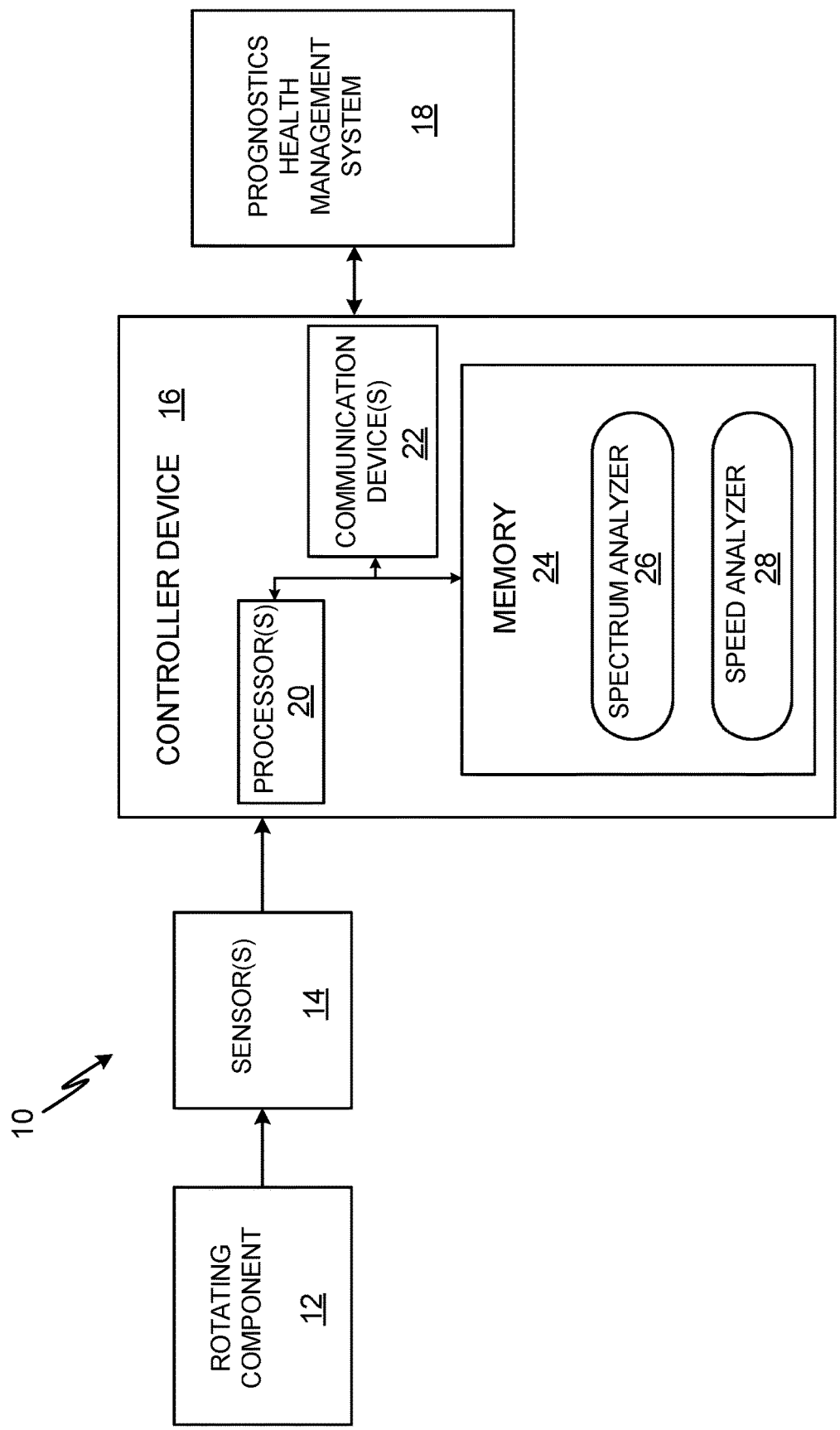
FIG. 1 is a schematic block diagram illustrating an example system that determines rotational speed of a rotating component using sensed vibrational data of the rotating component.

FIG. 1 is a schematic block diagram illustrating system 10 that determines rotational speed of rotating component 12 using sensed vibrational data of rotating component 12. As illustrated in FIG. 1, system 10 further includes one or more sensors 14, controller device 16 and prognostics and health management (PHM) system 18. Controller device 16 includes one or more processors 20, one or more communication devices 22, and computer-readable memory 24. Computer-readable memory 24 stores instructions that, when executed by one or more processors 20, cause controller device 16 to operate in accordance with techniques attributed herein to spectrum analyzer 26 and speed analyzer 28. Though illustrated and described as stored at computer-readable memory 24, it should be understood that functionality attributed herein to spectrum analyzer 26 and speed analyzer 28 can be performed in hardware, software, or combinations of hardware and software.

Controller 16, in operation, determines a rotational speed of rotating component 12 using vibrational data sensed by sensors 14, and outputs the determined rotational speed to, e.g., PHM system 18 and/or other consuming systems. Rotating component 12 can be any rotating component and/or system, such as a rotating shaft, gear, bearing, drive train, or other rotating component or system including one or more rotating components. In one example, rotating component 12 is a rotating drive shaft of an aircraft ventilation fan that is driven by, e.g., an electric induction motor. Sensors 14 include any one or more sensors configured to sense vibrational data of rotating component 12, such as one or more accelerometers, one or more velocimeters, one or more displacement sensors, or any other sensor (or sensors) capable of sensing dynamic (or instantaneous) vibration of rotating component 12 and transmitting an analog and/or digital signal indicative of the sensed vibration to controller device 16.

Controller device 16, as illustrated in FIG. 1, includes processor(s) 20. Processor 20, in one example, is configured to implement functionality and/or process instructions for execution within controller device 16 during operation. For instance, processor 20 can be capable of processing instructions stored in computer-readable memory 24, such as computer-readable instructions corresponding to spectrum analyzer 26 and speed analyzer 28. Examples of processor 20 can include any one or more of a microprocessor, a controller, a digital signal processor (DSP), an application specific integrated circuit (ASIC), a field-programmable gate array (FPGA), or other equivalent discrete or integrated logic circuitry.

Controller device 16 utilizes communication device(s) 22 to communicate with external devices via one or more communication networks and/or data buses. Communication device 22 can be any one or more of a network interface card, such as an Ethernet card, an optical transceiver, a radio frequency transceiver, or any other type of device that can send and receive information. Other examples of such communication devices can include Bluetooth, 3G, 4G, and WiFi radio transceivers as well as Universal Serial Bus (USB). In some examples, controller device 16 utilizes communication device 22 to wirelessly communicate with an external device.

Computer-readable memory 24 can be configured to store information within controller device 16 during operation. Computer-readable memory 24, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory 24, in some examples, is described as a volatile memory, meaning that computer-readable memory 24 does not maintain stored contents when power to controller device 16 is removed. Examples of volatile memories can include random access memories (RAM), dynamic random access memories (DRAM), static random access memories (SRAM), and other forms of volatile memories. In some examples, computer-readable memory 24 is used to store program instructions for execution by processor 20. Computer-readable memory 24, in one example, is used by software or applications running on controller device 16 (e.g., spectrum analyzer 26 and/or speed analyzer 28) to temporarily store information during program execution.

Computer-readable memory 24, in some examples, also includes one or more computer-readable storage media. Computer-readable memory 24 can be configured to store larger amounts of information than volatile memory. In some examples, computer-readable memory 24 includes non-volatile storage elements. Examples of such non-volatile storage elements can include magnetic hard discs, optical discs, floppy discs, flash memories, or forms of electrically programmable memories (EPROM) or electrically erasable and programmable memories (EEPROM).

PHM system 18 can be a lifecycle management or other prognostics and health management system that assesses the presence and extent of deviation or degradation of one or more systems and/or components from an expected (or nominal) operating condition to determine and/or predict the presence of failure conditions, an amount of remaining useful life (RUL) of components, or other prognostics and health information. PHM system 18, in one example, is a prognostics and health management system of, e.g., an aircraft, that utilizes the rotational speed of rotating component 12 determined by controller device 16 to identify fault conditions and/or a RUL of rotating component 12 or other components of a system that incorporates rotating component 12.

As illustrated in FIG. 1, sensors 14 are configured to sense vibrational data of rotating component 12. Sensors 14 (e.g., one or more accelerometers) are physically collocated with rotating component 12 to sense the vibrational data during rotation of rotating component 12. For example, sensors 14 can be disposed on a housing that encloses or otherwise contacts (directly or indirectly) rotating component 12 to sense vibrational data (e.g., acceleration) of rotating component 12. Sensors 14 are electrically and/or communicatively coupled with controller device 16 to transmit the sensed vibrational data via analog and/or digital signal to controller device 16 for spectral analysis and determination of a rotational speed of rotating component 12. In some examples, controller device 16 and sensors 14 are physically collocated, such as within a common electronics housing. In other examples, controller device 16 is remote from but electrically and/or communicatively coupled with sensors 14 to receive the vibrational data sensed by sensors 14.

Controller device 16 determines a rotational speed of rotating component 12 based on the sensed vibrational data received from sensors 14, as is further described below. Controller device 16, as illustrated in FIG. 1, is electrically and/or communicatively coupled with PHM system 18 to provide the determined rotational speed of rotating component 12 to PHM system 18.

In operation, sensors 14 sense vibrational data, such as acceleration, of rotating component 12. Sensors 14, in some examples, provide the sensed vibrational data as an analog signal to controller device 16, which samples the analog signal at a regular sampling rate via, e.g., an analog-to-digital converter, to produce a time sequence of the sensed vibrational data. In other examples, sensors 14 provide the sensed vibrational data as the time sequence of vibrational data, such as when sensors 14 or electronics connected thereto include an analog-to-digital converter or other equivalent circuitry.

Because the fundamental rotational speed of a rotating component is typically prominent as a local maximum in the vibrational frequency spectra of the rotating component, spectrum analyzer 26 of controller 16 converts the time sequence of vibrational data of rotating component 12 to frequency domain vibrational data, such as via a discrete Fourier transform (DFT) implemented via, e.g., a fast Fourier transform (FFT), a power spectral density (PSD) transform, or other transformation that converts time domain data to corresponding frequency domain data. Such frequency domain vibrational data includes magnitudes of component frequencies of the vibrational data at a plurality of uniformly-spaced frequency bins, such as 2048 frequency bins, 4096 frequency bins, 8192 frequency bins, or other numbers of uniformly-spaced frequency bins.

Speed analyzer 28 identifies a portion of the frequency domain vibrational data that corresponds to an expected rotational speed of rotating component 12. That is, rotating component 12 can be associated with an expected (or nominal) rotational rate, such as 100 Hz, 200 Hz, or other expected rotational speeds of rotating component 12. Speed analyzer 28 can access the expected rotational speed stored at, e.g., computer-readable memory 24, to identify a portion of the frequency domain vibrational data for use with spectral analysis and speed determination operations. As such, rather than analyze the entirety of the frequency domain vibrational data, speed analyzer 28 can identify a portion of the frequency domain vibrational data that corresponds to the expected rotational speed of rotating component 12 for spectral analysis and rotational speed determination operations, thereby decreasing a number of computational operations associated with the spectral analysis and increasing accuracy of peak detection operations described below.

Speed analyzer 28, in certain examples, identifies a frequency bin index of the plurality of frequency bins of the frequency domain vibrational data that corresponds to the expected rotational speed of rotating component 12 to identify the portion of the frequency domain vibrational data corresponding to the expected rotational speed. For example, speed analyzer 28 can identify the frequency bin index that corresponds to the expected rotational speed of rotating component 12 according to the following equation:

$$i_{estimate} = \text{round}\left(\frac{S \cdot H \cdot B}{f_{max}}\right) \quad \text{Equation (1)}$$

where: $i_{estimate}$ is the frequency bin index of the frequency domain vibrational data corresponding to the expected rotational speed of rotating component 12; S is the expected rotational speed of the rotating component (e.g., 195 Hz); H is a defined multiple of the expected rotational speed of the rotating component referred to as a shaft order (e.g., 1, 2, or other integer value); B is a number of frequency bin indices of the frequency domain vibrational data (e.g., 8192 or other numbers of frequency bin indices); $f_{max}$ is half of a time-based sampling rate of the time sequence of vibrational data (e.g., 50 Hz); and round is a rounding function that outputs a nearest integer of the operand.

Speed analyzer 28 can select a portion of the frequency domain vibrational data corresponding to the expected rotational speed of rotating component 12 as a defined number of frequency bin indices that enclose (e.g., symmetrically or asymmetrically) the identified frequency bin index that corresponds to the expected rotational speed of rotating component 12 (e.g., $i_{estimate}$ from Equation (1) above), such as five frequency bin indices, ten frequency bin indices, or other numbers of frequency bin indices. The defined number of frequency bin indices that enclose the identified frequency bin index and form the selected portion of the frequency domain vibrational data can be stored at, e.g., computer-readable memory 24 and accessed by speed analyzer 28.

Speed analyzer 28 identifies a frequency bin index within the selected portion of the frequency domain vibrational data that corresponds to a maximum vibration within the portion of the frequency domain vibrational data. The maximum vibration within the portion of the frequency domain vibrational data corresponds to the rotational speed of rotating component 12. As such, the frequency bin index associated with the maximum vibration can be utilized to determine the rotational speed of rotating component 12 from the sensed vibrational data received from sensors 14, but may not correspond directly to a true maximum vibration due to the discrete time-based sampling used to generate the time sequence of vibrational data. Accordingly, speed analyzer 28 fits the maximum vibration at the identified frequency bin index and vibrations associated with adjacent frequency bin indices to a model curve, such as a parabola, to more accurately estimate a true maximum vibration of rotating component 12.

Speed analyzer 28 can fit the maximum vibration at the identified frequency bin index and vibrations associated with adjacent frequency bin indices to the model curve using, e.g., $2^{nd}$ order parabolic interpolation or other curve fitting operations. The adjacent frequency bin indices can be, e.g., a frequency bin index that is sequentially-previous the identified frequency bin index and a frequency bin index that is sequentially-next the identified frequency bin index.

Speed analyzer 28 identifies a frequency bin index corresponding to a maximum of the model curve (e.g., a parabola), such as by using the following equation:

$$j_{true} = \frac{\ln(Q_{m-1}) - \ln(Q_{m+1})}{2 \cdot (\ln(Q_{m-1}) - 2 \cdot \ln(Q_m) + \ln(Q_{m+1}))} + m \quad \text{Equation (2)}$$

where $j_{true}$ is a floating point frequency bin index corresponding to the maximum of the model curve; m is the identified frequency bin index of the frequency domain vibrational data corresponding to the maximum vibration within the portion of the frequency domain vibrational data; $Q_m$ is the maximum vibration within the portion of the frequency domain vibrational data corresponding to the identified frequency bin index m; $Q_{m-1}$ is a vibration within the portion of the frequency domain vibrational data corresponding to a frequency bin index that is sequentially-previous the identified frequency bin index m; and $Q_{m+1}$ is a vibration within the portion of the frequency domain vibrational data corresponding to a frequency bin index that is sequentially-next the identified frequency bin index m.

Speed analyzer 28 determines the rotational speed of rotating component 12 based on the frequency bin index corresponding to the maximum of the model curve (e.g., $j_{true}$ from Equation (2) above). For example, speed analyzer 28 can determine the rotational speed of rotating component 12 based on the following equation:

$$\text{speed} = df \cdot \frac{(j_{true} + i_{estimate} - M)}{H} \quad \text{Equation (3)}$$

where speed is the rotational speed of rotating component 12 (e.g., in Hz); df is a ratio of a time-based sampling rate of the time sequence of vibrational data to a number of frequency bin indices of the frequency domain vibrational data (bin width); $j_{true}$ is the frequency bin index corresponding to the maximum of the model curve (e.g., determined from Equation (2) above); $i_{estimate}$ is a frequency bin index of the frequency domain vibrational data corresponding to the expected rotational speed of rotating component 12 (e.g., determined from Equation (1) above); M is half of a number of frequency bin indices within the identified portion of the frequency domain vibrational data corresponding to the expected rotational speed of rotating component 12; and H is a defined multiple of the expected rotational speed of rotating component 12 (e.g., 1).

Controller device 16 outputs the determined rotational speed of rotating component 12 to, e.g., PHM system 18 or other consuming system. Accordingly, controller device 16 determines a rotational speed of rotating component 12 via sensed vibrational data of rotating component 12 without requiring a tachometer or other additional speed sensing device to directly measure the rotational speed. Moreover, controller device 16, implementing techniques of this disclosure, utilizes model curve fitting and interpolation techniques to increase accuracy of the rotational speed determinations, thereby enhancing prognostics or other downstream derivations that utilize the rotational speed of rotating component 12.

Figure 2:
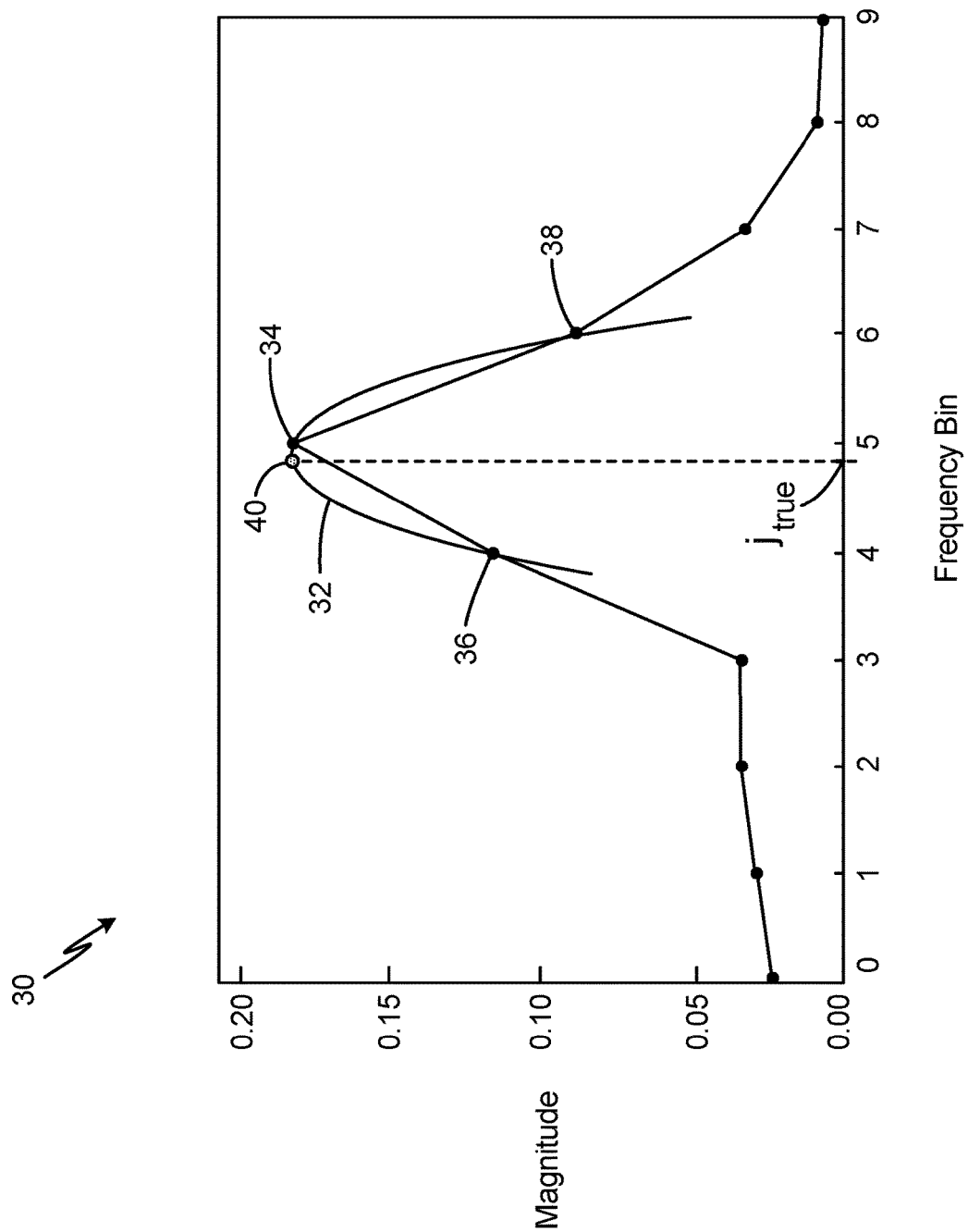
FIG. 2 is a graph of frequency domain vibrational data showing a model curve fit that can be used to determine rotational speed of a rotating component.

FIG. 2 illustrates graph 30 of frequency domain vibrational data showing model curve 32 that can be used to determine rotational speed of a rotating component. For purposes of clarity and ease of discussion, the example of FIG. 2 is described below in the context of system 10 of FIG. 1.

As illustrated in FIG. 2, graph 30 shows magnitude of vibration plotted against corresponding frequency bin indices 0-9. In the example of FIG. 2, graph 30 illustrates a selected portion of frequency domain vibrational data selected by speed analyzer 28 based on an expected rotational speed of rotating component 12. That is, in the example of FIG. 2, speed analyzer 28 has identified a portion of frequency domain vibrational data converted from a time sequence of vibrational data of rotating component 12 sensed by sensors 14.

Speed analyzer 28, in the example of FIG. 2, identifies frequency bin index 5 corresponding to maximum vibration 34 of the selected portion of the frequency domain vibrational data. Speed analyzer 28 fits model curve 32 (i.e., a parabola in the example of FIG. 2) through each of maximum vibration 34 (at frequency bin index 5), sequentially-previous vibration 36 (at frequency bin index 4), and sequentially-next vibration 38 (at frequency bin index 6) using, e.g., $2^{nd}$ order parabolic interpolation techniques.

Speed analyzer 28 identifies frequency bin index $j_{true}$ corresponding to maximum vibration 40 of model curve 32 using, e.g., Equation (2) above. In the example of FIG. 2, maximum vibration 40 corresponds to an approximate magnitude of vibration of 0.18 (measured in, e.g., g-force), and $j_{true}$ has a value of approximately 4.8. Speed analyzer 28 determines the rotational speed of rotating component 12 based on frequency bin index $j_{true}$ using, e.g., Equation (3) above.

Accordingly, rather than determine the rotational speed of rotating component 12 based on index 5 corresponding to the maximum vibration of the frequency domain vibrational data converted from the time sequence of sensed vibrational data, speed analyzer 28 determines an estimated maximum vibration corresponding to model curve 32 that more accurately reflects the physical phenomenon of continuous vibrational motion of rotating component 12. Speed analyzer 28 determines the rotational speed of rotating component 12 based on the frequency bin index corresponding to the maximum of model curve 32, thereby increasing accuracy of the speed determination operations.

Figure 3:
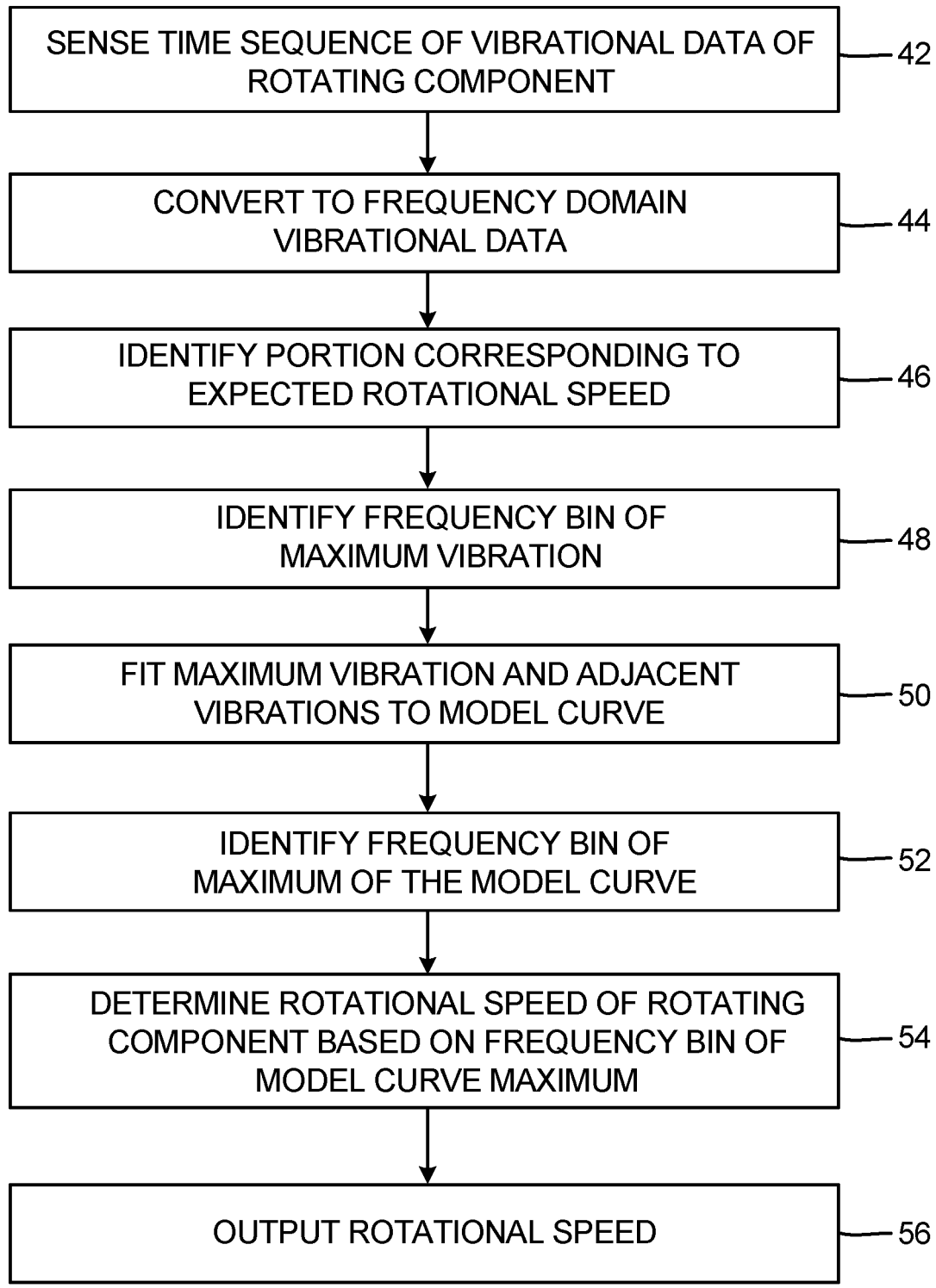
FIG. 3 is a flow diagram illustrating example operations to determine rotational speed of a rotating component using sensed vibrational data of the rotating component.

FIG. 3 is a flow diagram illustrating example operations to determine rotational speed of a rotating component using sensed vibrational data of the rotating component. For purposes of clarity and ease of discussion, the example operations are described below within the context of system 10 of FIG. 1.

A time sequence of vibrational data of a rotating component is sensed using one or more sensors (Step 42). For example, sensors 14 (e.g., one or more accelerometers, velocimeters, displacement sensors, or other sensors capable of sensing vibration) can sense a time sequence of vibrational data of rotating component 12. The time sequence of vibrational data is converted to frequency domain vibrational data (Step 44). For instance, spectrum analyzer 26 of controller device 16 can convert the time sequence of vibrational data received from sensors 14 to frequency domain vibrational data using, e.g., a FFT, DFT, PSD, or other transform that converts time domain data to corresponding frequency domain data.

A portion of the frequency domain vibrational data corresponding to an expected rotational speed of the rotating component is identified (Step 46). For example, computer-readable memory 24 can store an expected (or nominal) rotational speed of rotating component 12, such as 195 Hz or other rotational speeds. Speed analyzer 28 can identify a frequency bin index of the frequency domain vibrational data corresponding to the expected rotational speed, such as according to Equation (1) above. Speed analyzer 28 can select a portion of the frequency domain vibrational data that encloses (symmetrically or asymmetrically) the identified frequency bin index, such as five frequency bin indices, ten frequency bin indices, or other numbers of frequency bin indices.

A frequency bin index of the frequency domain vibrational data corresponding to a maximum vibration within the portion of the frequency domain vibrational data is identified (Step 48). For instance, speed analyzer 28 can identify the maximum magnitude of vibration of the portion of the frequency domain vibrational data, and can identify the frequency bin index associated with the maximum magnitude of vibration. The maximum vibration at the identified frequency bin index and vibrations associated with adjacent frequency bin indices are fit to a model curve (Step 50). For example, speed analyzer 28 can fit the maximum vibration at the identified frequency fin index, a vibration at a frequency bin index that is sequentially-previous the identified frequency bin index, and a vibration at a frequency bin index that is sequentially-next the identified frequency bin index to a parabola using $2^{nd}$ order parabolic interpolation techniques.

The frequency bin index corresponding to a maximum of the model curve is identified (Step 52). For instance, speed analyzer 28 can identify the frequency bin index corresponding to the maximum of the model curve according to Equation (2) above. The rotational speed of the rotating component is determined based on the frequency bin index corresponding to the maximum of the model curve (Step 54). For example, speed analyzer 28 can determine the rotational speed of rotating component 12 based on the identified frequency bin index corresponding to the maximum of the model curve according to Equation (3) above. The rotational speed of the rotating component is output (Step 56). For instance, controller device 16 can output the determined rotational speed of rotating component 12 to PHM system 18 or other consuming systems.

Accordingly, system 10 implementing techniques of this disclosure determines the rotational speed of rotating component 12 based on vibrational data of rotating component 12 sensed by one or more sensors 14. Rather than require a tachometer or other sensor to directly measure the rotational speed, system 10 determines the rotational speed of rotating component 12 via spectral analysis of the received vibrational data. Model curve fitting and interpolation techniques implemented by controller device 16 further improve the accuracy of the rotational speed determinations, thereby increasing accuracy of downstream derivations and/or prognostics and health management related operations.

Discussion of Possible Embodiments

The following are non-exclusive descriptions of possible embodiments of the present invention.

In one example, a method includes sensing a time sequence of vibrational data of the rotating component using one or more sensors, converting the time sequence of vibrational data to frequency domain vibrational data, and identifying a portion of the frequency domain vibrational data corresponding to an expected rotational speed of the rotating component. The method further includes identifying a frequency bin index of the frequency domain vibrational data corresponding to a maximum vibration within the portion of the frequency domain vibrational data, and fitting the maximum vibration at the identified frequency bin index and vibrations associated with adjacent frequency bin indices to a model curve. The method further includes identifying a floating point frequency bin index corresponding to a maximum of the model curve, and determining the rotational speed of the rotating component based on the frequency bin index corresponding to the maximum of the model curve.

The method of the preceding paragraph can optionally include, additionally and/or alternatively, any one or more of the following features, configurations, operations, and/or additional components:

Sensing the time sequence of the vibrational data of the rotating component can include sensing the time sequence of the vibrational data of the rotating component using one or more accelerometers.

Converting the time sequence of vibrational data to the frequency domain vibrational data can include converting the time sequence of vibrational data to the frequency domain vibrational data using one of a discrete Fourier transform and a power spectral density transformation.

Identifying the portion of the frequency domain vibrational data corresponding to the expected rotational speed of the rotating component can include: identifying a frequency bin index of the frequency domain vibrational data corresponding to the expected rotational speed of the rotating component; and identifying the portion of the frequency domain vibrational data corresponding to the expected rotational speed of the rotating component as a portion of the frequency domain vibrational data centered around the frequency bin index of the frequency domain vibrational data corresponding to the expected rotational speed of the rotating component.

Identifying the frequency bin index of the frequency domain vibrational data corresponding to the expected rotational speed of the rotating component can include identifying the frequency bin index of the frequency domain vibrational data according to the following equation:

$$i_{estimate} = \text{round}\left(\frac{S \cdot H \cdot B}{f_{max}}\right)$$

where $i_{estimate}$ is the frequency bin index of the frequency domain vibrational data corresponding to the expected rotational speed of the rotating component; S is the expected rotational speed of the rotating component; H is a defined multiple of the expected rotational speed of the rotating component; B is a number of frequency bin indices of the frequency domain vibrational data; $f_{max}$ is half of a time-based sampling rate of the time sequence of vibrational data; and round is a rounding function that outputs a nearest integer.

The model curve can include a parabola.

Fitting the maximum vibration at the identified frequency bin index and vibrations associated with adjacent frequency bin indices to the model curve can include fitting the maximum vibration at the identified frequency bin index, a vibration at a frequency bin index that is sequentially-previous the identified frequency bin index, and a vibration at a frequency bin index that is sequentially-next the identified frequency bin index to the parabola using second order parabolic interpolation.

Identifying the frequency bin index corresponding to the maximum of the model curve can include identifying the frequency bin index corresponding to the maximum of the model curve according to the following equation:

$$j_{true} = \frac{\ln(Q_{m-1}) - \ln(Q_{m+1})}{2 \cdot (\ln(Q_{m-1}) - 2 \cdot \ln(Q_m) + \ln(Q_{m+1}))} + m$$

where: $j_{true}$ is the floating point frequency bin index corresponding to the maximum of the model curve; m is the identified frequency bin index of the frequency domain vibrational data corresponding to the maximum vibration within the portion of the frequency domain vibrational data; $Q_m$ is the maximum vibration within the portion of the frequency domain vibrational data corresponding to the identified frequency bin index m; $Q_{m-1}$ is a vibration within the portion of the frequency domain vibrational data corresponding to a frequency bin index that is sequentially-previous the identified frequency bin index m; and $Q_{m+1}$ is a vibration within the portion of the frequency domain vibrational data corresponding to a frequency bin index that is sequentially-next the identified frequency bin index m.

Determining the rotational speed of the rotating component based on the frequency bin index corresponding to the maximum of the model curve can include determining the rotational speed of the rotating component according to the following equation:

$$\text{speed} = df \cdot \frac{(j_{true} + i_{estimate} - M)}{H}$$

where: speed is the rotational speed of the rotating component; df is a ratio of a time-based sampling rate of the time sequence of vibrational data to a number of frequency bin indices of the frequency domain vibrational data; $j_{true}$ is the frequency bin index corresponding to the maximum of the model curve; $i_{estimate}$ is a frequency bin index of the frequency domain vibrational data corresponding to the expected rotational speed of the rotating component; M is half of a number of frequency bin indices within the identified portion of the frequency domain vibrational data corresponding to the expected rotational speed of the rotating component; and H is a defined multiple of the expected rotational speed of the rotating component.

The method can further include providing the determined rotational speed of the rotating component to a prognostics health management system of an aircraft.

A system includes a rotating component, one or more sensors, one or more processors, and computer-readable memory. The one or more sensors are disposed to sense a time sequence of vibrational data of the rotating component. The computer-readable memory is encoded with instructions that, when executed by the one or more processors, cause the one or more processors to convert the time sequence of vibrational data to frequency domain vibrational data, identify a portion of the frequency domain vibrational data corresponding to an expected rotational speed of the rotating component, and identify a frequency bin index of the frequency domain vibrational data corresponding to a maximum vibration within the portion of the frequency domain vibrational data. The computer-readable memory is further encoded with instructions that, when executed by the one or more processors, cause the one or more processors to fit the maximum vibration at the identified frequency bin index and vibrations associated with adjacent frequency bin indices to a model curve, identify a floating point frequency bin index corresponding to a maximum of the model curve, and determine the rotational speed of the rotating component based on the frequency bin index corresponding to the maximum of the model curve.

The system of the preceding paragraph can optionally include, additionally and/or alternatively, any one or more of the following features, configurations, operations, and/or additional components:

The one or more sensors can include one or more accelerometers.

The computer-readable memory can be further encoded with instructions that, when executed by the one or more processors, cause the one or more processors to convert the time sequence of vibrational data to the frequency domain vibrational data using one of a discrete Fourier transform and a power spectral density transformation.

The computer-readable memory can be further encoded with instructions that, when executed by the one or more processors, cause the one or more processors to identify the portion of the frequency domain vibrational data corresponding to the expected rotational speed of the rotating component by at least being configured to: identify a frequency bin index of the frequency domain vibrational data corresponding to the expected rotational speed of the rotating component; and identify the portion of the frequency domain vibrational data corresponding to the expected rotational speed of the rotating component as a portion of the frequency domain vibrational data centered around the frequency bin index of the frequency domain vibrational data corresponding to the expected rotational speed of the rotating component.

The computer-readable memory is further encoded with instructions that, when executed by the one or more processors, cause the one or more processors to identify the frequency bin index of the frequency domain vibrational data corresponding to the expected rotational speed of the rotating component according to the following equation:

$$i_{estimate} = \text{round}\left(\frac{S \cdot H \cdot B}{f_{max}}\right)$$

where $i_{estimate}$ is the frequency bin index of the frequency domain vibrational data corresponding to the expected rotational speed of the rotating component; S is the expected rotational speed of the rotating component; H is a defined multiple of the expected rotational speed of the rotating component; B is a number of frequency bin indices of the frequency domain vibrational data; $f_{max}$ is half of a time-based sampling rate of the time sequence of vibrational data; and round is a rounding function that outputs a nearest integer.

The model curve can include a parabola.

The computer-readable memory can be further encoded with instructions that, when executed by the one or more processors, cause the one or more processors to fit the maximum vibration at the identified frequency bin index and vibrations associated with adjacent frequency bin indices to the model curve using second order parabolic interpolation.

The computer-readable memory can be further encoded with instructions that, when executed by the one or more processors, cause the one or more processors to identify the frequency bin index corresponding to the maximum of the model curve according to the following equation:

$$j_{true} = \frac{\ln(Q_{m-1}) - \ln(Q_{m+1})}{2 \cdot (\ln(Q_{m-1}) - 2 \cdot \ln(Q_m) + \ln(Q_{m+1}))} + m$$

where: $j_{true}$ is the floating point frequency bin index corresponding to the maximum of the model curve; m is the identified frequency bin index of the frequency domain vibrational data corresponding to the maximum vibration within the portion of the frequency domain vibrational data; $Q_m$ is the maximum vibration within the portion of the frequency domain vibrational data corresponding to the identified frequency bin index m; $Q_{m-1}$ is a vibration within the portion of the frequency domain vibrational data corresponding to a frequency bin index that is sequentially-previous the identified frequency bin index m; and $Q_{m+1}$ is a vibration within the portion of the frequency domain vibrational data corresponding to a frequency bin index that is sequentially-next the identified frequency bin index m.

The computer-readable memory can be further encoded with instructions that, when executed by the one or more processors, cause the one or more processors to determine the rotational speed of the rotating component based on the frequency bin index corresponding to the maximum of the model curve according to the following equation:

$$\text{speed} = df \cdot \frac{(j_{true} + i_{estimate} - M)}{H}$$

where: speed is the rotational speed of the rotating component; df is a ratio of a time-based sampling rate of the time sequence of vibrational data to a number of frequency bin indices of the frequency domain vibrational data; $j_{true}$ is the frequency bin index corresponding to the maximum of the model curve; $i_{estimate}$ is a frequency bin index of the frequency domain vibrational data corresponding to the expected rotational speed of the rotating component; M is half of a number of frequency bin indices within the identified portion of the frequency domain vibrational data corresponding to the expected rotational speed of the rotating component; and H is a defined multiple of the expected rotational speed of the rotating component.

The system can further include one or more communication devices. The computer-readable memory can be further encoded with instructions that, when executed by the one or more processors, cause the one or more processors to output, via the one or more communication devices, the determined rotational speed of the rotating component to a prognostics health management system of an aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A method for determining rotational speed of a rotating component, the method comprising:
   sensing a time sequence of vibrational data of the rotating component using one or more sensors;
   converting the time sequence of vibrational data to frequency domain vibrational data;
   identifying a portion of the frequency domain vibrational data corresponding to an expected rotational speed of the rotating component;
   identifying a frequency bin index of the frequency domain vibrational data corresponding to a maximum vibration within the portion of the frequency domain vibrational data;
   fitting the maximum vibration at the identified frequency bin index and vibrations associated with adjacent frequency bin indices to a model curve;
   identifying a floating point frequency bin index corresponding to a maximum of the model curve;
   determining the rotational speed of the rotating component based on the frequency bin index corresponding to the maximum of the model curve;
   providing the rotational speed of the rotating component to a prognostics health management system of an aircraft; and
   identifying, by the prognostics health management system using the rotational speed, a fault condition of the rotating component;
   wherein identifying the portion of the frequency domain vibrational data corresponding to the expected rotational speed of the rotating component comprises:
      identifying a frequency bin index of the frequency domain vibrational data corresponding to the expected rotational speed of the rotating component; and
      identifying the portion of the frequency domain vibrational data corresponding to the expected rotational speed of the rotating component as a portion of the frequency domain vibrational data centered around the frequency bin index of the frequency domain vibrational data corresponding to the expected rotational speed of the rotating component.

2. The method of claim 1,
wherein sensing the time sequence of the vibrational data of the rotating component comprises sensing the time sequence of the vibrational data of the rotating component using one or more accelerometers.

3. The method of claim 1,
wherein converting the time sequence of vibrational data to the frequency domain vibrational data comprises converting the time sequence of vibrational data to the frequency domain vibrational data using one of a discrete Fourier transform and a power spectral density transformation.

4. The method of claim 1,
wherein identifying the frequency bin index of the frequency domain vibrational data corresponding to the expected rotational speed of the rotating component comprises identifying the frequency bin index of the frequency domain vibrational data according to the following equation:

$$i_{estimate} = \text{round}\left(\frac{S \cdot H \cdot B}{f_{max}}\right)$$

wherein $i_{estimate}$ is the frequency bin index of the frequency domain vibrational data corresponding to the expected rotational speed of the rotating component;
wherein S is the expected rotational speed of the rotating component;
wherein H is a defined multiple of the expected rotational speed of the rotating component;
wherein B is a number of frequency bin indices of the frequency domain vibrational data;
wherein $f_{max}$ is half of a time-based sampling rate of the time sequence of vibrational data; and
wherein round is a rounding function that outputs a nearest integer.

5. The method of claim 1,
wherein the model curve comprises a parabola.

6. The method of claim 5,
wherein fitting the maximum vibration at the identified frequency bin index and vibrations associated with adjacent frequency bin indices to the model curve comprises fitting the maximum vibration at the identified frequency bin index, a vibration at a frequency bin index that is sequentially-previous the identified frequency bin index, and a vibration at a frequency bin index that is sequentially-next the identified frequency bin index to the parabola using second order parabolic interpolation.

7. The method of claim 1,
wherein identifying the frequency bin index corresponding to the maximum of the model curve comprises identifying the frequency bin index corresponding to the maximum of the model curve according to the following equation:

$$j_{true} = \frac{\ln(Q_{m-1}) - \ln(Q_{m+1})}{2 \cdot (\ln(Q_{m-1}) - 2 \cdot \ln(Q_m) + \ln(Q_{m+1}))} + m$$

wherein $j_{true}$ is the frequency bin index corresponding to the maximum of the model curve;
wherein m is the identified frequency bin index of the frequency domain vibrational data corresponding to the maximum vibration within the portion of the frequency domain vibrational data;
wherein $Q_m$ is the maximum vibration within the portion of the frequency domain vibrational data corresponding to the identified frequency bin index m;
wherein $Q_{m-1}$ is a vibration within the portion of the frequency domain vibrational data corresponding to a frequency bin index that is sequentially-previous the identified frequency bin index m; and
wherein $Q_{m+1}$ is a vibration within the portion of the frequency domain vibrational data corresponding to a frequency bin index that is sequentially-next the identified frequency bin index m.

8. The method of claim 1,
wherein determining the rotational speed of the rotating component based on the frequency bin index corresponding to the maximum of the model curve comprises determining the rotational speed of the rotating component according to the following equation:

$$\text{speed} = df \cdot \frac{(j_{true} + i_{estimate} - M)}{H}$$

wherein speed is the rotational speed of the rotating component;

wherein $d_f$ is a ratio of a time-based sampling rate of the time sequence of vibrational data to a number of frequency bin indices of the frequency domain vibrational data;

wherein $i_{true}$ is the frequency bin index corresponding to the maximum of the model curve;

wherein $i_{estimate}$ is a frequency bin index of the frequency domain vibrational data corresponding to the expected rotational speed of the rotating component;

wherein M is half of a number of frequency bin indices within the identified portion of the frequency domain vibrational data corresponding to the expected rotational speed of the rotating component; and wherein H is a defined multiple of the expected rotational speed of the rotating component.

9. A system comprising:
a rotating component;
one or more sensors disposed to sense a time sequence of vibrational data of the rotating component;
a prognostics health management system of an aircraft; and
a controller device, the controller device comprising:
  one or more communication devices;
  one or more processors; and
  computer-readable memory encoded with instructions that, when executed by the one or more processors, cause the one or more processors to:
    convert the time sequence of vibrational data to frequency domain vibrational data;
    identify a portion of the frequency domain vibrational data corresponding to an expected rotational speed of the rotating component by at least being configured to:
      identify a frequency bin index of the frequency domain vibrational data corresponding to the expected rotational speed of the rotating component; and
      identify the portion of the frequency domain vibrational data corresponding to the expected rotational speed of the rotating component as a portion of the frequency domain vibrational data centered around the frequency bin index of the frequency domain vibrational data corresponding to the expected rotational speed of the rotating component;
    identify a frequency bin index of the frequency domain vibrational data corresponding to a maximum vibration within the portion of the frequency domain vibrational data;
    fit the maximum vibration at the identified frequency bin index and vibrations associated with adjacent frequency bin indices to a model curve;
    identify a floating point frequency bin index corresponding to a maximum of the model curve;
    determine the rotational speed of the rotating component based on the frequency bin index corresponding to the maximum of the model curve; and
    output, via the one or more communication devices, the determined rotational speed of the rotating component to the prognostics health management system of the aircraft;

wherein the prognostics health management system is configured to identify, using the rotational speed, a fault condition of the rotating component.

10. The system of claim 9,
wherein the one or more sensors include one or more accelerometers.

11. The system of claim 9,
wherein the computer-readable memory is further encoded with instructions that, when executed by the one or more processors, cause the one or more processors to convert the time sequence of vibrational data to the frequency domain vibrational data using one of a discrete Fourier transform and a power spectral density transformation.

12. The system of claim 9,
wherein the computer-readable memory is further encoded with instructions that, when executed by the one or more processors, cause the one or more processors to identify the frequency bin index of the frequency domain vibrational data corresponding to the expected rotational speed of the rotating component according to the following equation:

$$i_{estimate} = \text{round}\left(\frac{S \cdot H \cdot B}{f_{max}}\right)$$

wherein $i_{estimate}$ is the frequency bin index of the frequency domain vibrational data corresponding to the expected rotational speed of the rotating component;

wherein S is the expected rotational speed of the rotating component;

wherein H is a defined multiple of the expected rotational speed of the rotating component;

wherein B is a number of frequency bin indices of the frequency domain vibrational data;

wherein $f_{max}$ is half of a time-based sampling rate of the time sequence of vibrational data; and wherein round is a rounding function that outputs a nearest integer.

13. The system of claim 9,
wherein the model curve comprises a parabola.

14. The system of claim 13,
wherein the computer-readable memory is further encoded with instructions that, when executed by the one or more processors, cause the one or more processors to fit the maximum vibration at the identified frequency bin index and vibrations associated with adjacent frequency bin indices to the model curve using second order parabolic interpolation.

15. The system of claim 9,
wherein the computer-readable memory is further encoded with instructions that, when executed by the one or more processors, cause the one or more processors to identify the frequency bin index corresponding to the maximum of the model curve according to the following equation:

$$j_{true} = \frac{\ln(Q_{m-1}) - \ln(Q_{m+1})}{2 \cdot (\ln(Q_{m-1}) - 2 \cdot \ln(Q_m) + \ln(Q_{m+1}))} + m$$

wherein $j_{true}$ is the frequency bin index corresponding to the maximum of the model curve;

wherein m is the identified frequency bin index of the frequency domain vibrational data corresponding to the maximum vibration within the portion of the frequency domain vibrational data;

wherein $Q_m$ is the maximum vibration within the portion of the frequency domain vibrational data corresponding to the identified frequency bin index m;

wherein $Q_{m-1}$ is a vibration within the portion of the frequency domain vibrational data corresponding to a frequency bin index that is sequentially-previous the identified frequency bin index m; and wherein $Q_{m+1}$ is a vibration within the portion of the frequency domain vibrational data corresponding to a frequency bin index that is sequentially-next the identified frequency bin index m.

16. The system of claim 9, wherein the computer-readable memory is further encoded with instructions that, when executed by the one or more processors, cause the one or more processors to determine the rotational speed of the rotating component based on the frequency bin index corresponding to the maximum of the model curve according to the following equation:

$$\text{speed} = df \cdot \frac{(j_{true} + i_{estimate} - M)}{H}$$

wherein peed is the rotational speed of the rotating component;

wherein df is a ratio of a time-based sampling rate of the time sequence of vibrational data to a number of frequency bin indices of the frequency domain vibrational data;

wherein $j_{true}$ is the frequency bin index corresponding to the maximum of the model curve;

wherein $i_{estimate}$ is a frequency bin index of the frequency domain vibrational data corresponding to the expected rotational speed of the rotating component;

wherein M is half of a number of frequency bin indices within the identified portion of the frequency domain vibrational data corresponding to the expected rotational speed of the rotating component; and wherein H is a defined multiple of the expected rotational speed of the rotating component.

* * * * *